United States Patent [19]

DeLuca et al.

[11] Patent Number: 4,765,948
[45] Date of Patent: Aug. 23, 1988

[54] COOLANT CIRCULATION SYSTEM FOR A LIQUID METAL NUCLEAR REACTOR

[75] Inventors: Robert A. DeLuca, Newton Centre; George Garabedian, Boston, both of Mass.

[73] Assignee: Stone & Webster Engineering Corporation, Boston, Mass.

[21] Appl. No.: 902,228

[22] Filed: Aug. 29, 1986

[51] Int. Cl.$^4$ .................... G21C 15/24; H02K 44/02; G21D 1/04
[52] U.S. Cl. .................................. 376/404; 376/402; 417/50; 310/11
[58] Field of Search ........................... 310/11; 417/50; 376/179, 403, 404, 405, 402

[56] References Cited

U.S. PATENT DOCUMENTS

| | | | |
|---|---|---|---|
| 3,280,349 | 10/1966 | Brenner et al. | 310/11 |
| 3,413,504 | 11/1968 | Baker | 310/11 |
| 3,517,229 | 6/1970 | Bidard | 310/11 |
| 3,885,890 | 5/1975 | Davidson | 417/50 |
| 4,174,190 | 11/1979 | Craig et al. | 417/50 |
| 4,177,015 | 12/1979 | Davidson | 417/50 |
| 4,233,537 | 11/1980 | Limpaecher | 376/121 |
| 4,449,890 | 5/1984 | Barzantny et al. | 417/50 |
| 4,469,471 | 9/1984 | Keeton et al. | 417/50 |
| 4,505,644 | 3/1985 | Meisner et al. | 417/50 |
| 4,527,955 | 7/1985 | Duncombe et al. | 417/50 |

FOREIGN PATENT DOCUMENTS 1556258 3/1977 United Kingdom .

OTHER PUBLICATIONS

Electromagnetic Pumps for Large Pool-Concept LMFBR EPRI NP-1265 (Dec. 1979).

*Primary Examiner*—Deborah L. Kyle
*Assistant Examiner*—Richard L. Klein
*Attorney, Agent, or Firm*—Hedman, Gibson, Costigan & Hoare

[57] ABSTRACT

A liquid metal circulation system is disclosed which is suitable for use in connection with a nuclear reactor. The circulation system of the invention includes an electromagnetic pump having a central core body featuring a helically configured, six pole magnet, optionally directing flow to one or a series of flow couplers, which generates sufficient liquid metal flow to be used as the primary circulation means for the nuclear reactor. The increased safety, design simplicity, and efficiency of such circulation system overcomes many of the drawbacks of conventional circulation systems.

22 Claims, 10 Drawing Sheets

COOLANT CIRCULATION SYSTEM FOR A LIQUID METAL NUCLEAR REACTOR

FIELD OF INVENTION

The present invention relates to coolant circulation systems, such as may be used in a liquid metal coolant system of a nuclear power plant. More particularly, it relates to a coolant circulation system utilizing an annular linear induction pump. In one embodiment a fluid flow coupler operates in combination with the annular linear induction pump to replace traditionally powered pumps for the main heat transport system. The annular linear induction pump is capable of continuous operation on alternating current (A/C) without external cooling. As in additional safety feature, it can operate for extended periods on direct current. Both pumps provide improved reliability and safety by eliminating movable parts susceptible to wear and/or malfunction.

BACKGROUND OF THE INVENTION

Electromagnetic (EM) pumps utilizing the electrical conductivity of liquid metals such as sodium or a sodium-potassium alloy are known. The absence of movable parts in such pumps provides simplicity and reliability over conventional mechanical pumps. However, the application of electromagnetic pumps to the main coolant circulation systems of liquid metal reactors has been limited by safety considerations, by the inherent bulkiness of conventional design approaches, and by difficulties in designing electrical insulation for high temperature and high voltage applications.

The present annular linear induction pump can replace either the primary or secondary mechanical pump typically used in liquid metal cooled nuclear reactors. EM pumps for liquid metal circulation systems have been limited to small size applications (less than 6,000 gpm). Large pumps have required active cooling systems for the electrical conductors in order to keep the copper and its electrical insulation within allowable operating limits. In addition, the availability of electrical insulation capable of functioning at the high temperatures (approximately 500° C.) and high voltage (approximately 6,000 volts) typically experienced in conventional reactors has been a design problem requiring research and development. The introduction of a pump cooling system complicates the reactor design and reduces system efficiency. Additionally, the pump coolant system complicates the reactor installation. See, "Electromagnetic Pumps For Large Pool-Concept LMFBR", Research Institute Report No. NP-1265, (Palo Alto 1979), U.S. Pat. Nos. 4,527,955 and 4,505,644.

A serious drawback of prior art electromagnetic pumps is their inability to sustain coolant flow upon loss of electrical power. In the event of a power outage or plant shutdown, prior art electromagnetic pumps cease functioning. Mechanical pumps can be designed with a flywheel as part of the motor assembly to provide a slow coast-down in flow rate. Such a safety feature can assure that the nuclear reactor fuel assemblies are maintained within an acceptable temperature range. Conventional electromagnetic pumps require a motor generator set to assure a slow coat-down and costly diesel or gas turbine generator systems to provide enough alternating current to maintain coolant flow at a rate sufficient to remove decay heat from the reactor's fuel elements.

The liquid metal circulation system of the present invention, including a uniquely configured electromagnetic pump, optionally connected to one or a series of fluid flow couplers, can replace the conventional primary and secondary coolant pumps of a nuclear reactor. The flow coupled is a specialized direct current electromagnetic generator and pump connected together in a common magnetic field. The direct current linking the primary and intermediate flows is generated locally, enabling the use of higher current/lower voltage than would be possible with a traditional direct current pump. See, for example, U.S. Pat. No. 4,469,471. Despite these advantages, the flow couplers of the prior art still retain several drawbacks. Though smaller than standard direct current electromagnetic pumps, prior art flow couplers utilize electromagnets to magnetically interconnect the liquid metal flows through the opposing parallel flow paths. The inherent bulkiness of this design feature complicates installation. The preferred flow couplers contemplated herein utilize permanent magnets instead of electromagnets and thus eliminate the need for a constant power source.

SUMMARY OF THE INVENTION

Accordingly, it is a primary object of this invention to provide a novel and highly reliable coolant circulation system for application in a nuclear reactor setting.

It is a further object to provide a coolant circulation system which provides a method for safely shutting down a nuclear power plant in the event of a power loss or plant shutdown, by providing a gradually decreasing flow, and which is capable of extended operation without alternating current at low flows.

It is a further object to provide a liquid metal circulation system that has improved efficiency, reliability and safety over prior art designs which is capable of circulating large flows (e.g., greater than 30,000 gpm).

It is a further object to provide a large capacity liquid metal EM pump that requires no external cooling.

It is a further object to provide an electromagnetic pump that provides a slow decay of flow in the event station A/C power is lost.

It is a further object to provide a large capacity liquid metal EM pump whereby the conductors do not require high voltage electrical insulation for pump operation.

It is a further object to provide a large capacity electromagnetic pump that does not require A/C power to operate at low flows.

It is a further object to provide an electromagnetic fluid flow coupler which requires no electrical power and no external cooling.

Finally, it is an object of this invention to provide an integrated satellite vessel including an annular linear induction pump, a series of fluid flow couplers, a heat exchanger, and a steam generator.

The present invention remedies the drawbacks of prior art electromagnetic pumps to provide a coolant circulation system capable of operation following power failure or plant shutdown.

The annular linear induction pump provides increased safety and reliability over similar pumps in the prior art. Its design allows greatly increased flow while simultaneously eliminating the need for external cooling through the use of a coil design capable of functioning at high amperages and low voltage. The present pump may incorporate a homopolar generator which allows for gradual reduction to about 10% of flow rate upon loss of power or shutdown. Such a rate of flow is sufficient to remove decay heat from the reactor's fuel elements, and can be maintained for an extended period by a connected series of batteries, if required.

The pump is comprised of a central core body mounted within a pump housing, the gap between core body and housing forming an annular flow passage. A three-phase alternating current supply provides a traveling radial field in the primary coils which are helically wound on the central core body. The liquid metal tends to follow the helical path as the metal flows upwardly through the annular flow passage. Longitudinal baffles equally spaced ground the flow passage are preferably employed to inhibit rotation of the liquid metal coolant.

The longitudinal baffles also may be constructed as electrodes to enable the pump to operate on direct current (D/C). liquid metal homopolar generator, equipped with an energy storing flywheel, is connected to the coil windings and to the electrodes through appropriate switching. During normal pump operation, the homopolar generator is disconnected from the coil windings and the electrodes. In the event of complete loss of alternating current, appropriate switches automatically disconnect the pump from the alternating current source and connect the homopolar generator to the coil windings and to the electrodes. The energy stored in the flywheel is transferred through the homopolar generator in the form of high direct current and moderately low voltage e.g., less than ninety volts, to the coil windings and the electrodes, allowing the pump to continue to circulate the liquid metal for several minutes following the complete loss of alternating current.

A plurality of batteries series/parallel connected so as to deliver high direct current at low voltage e.g. approximately 8 volts, enable the electromagnetic pump of the present invention to continue operating for an extended period of time after shutdown in order to remove decay heat from the reactor core. The batteries are connected to the homopolar generator leads through appropriate switching. During normal pump operation, the batteries are disconnected from the system. In the event of complete loss of alternating current, and after the homopolar generator output has decayed to approximately 10 percent of the full flow capacity of the pump, the homopolar generator is disconnected from the pump leads and the batteries are connected, allowing the pump to continue to circulate the liquid metal for extended periods at approximately 10 percent or less of capacity.

The fluid flow coupler disclosed herein utilizes permanent magnets to provide the necessary magnetic field. A separate system pump circulates a liquid metal through one of two parallel ducts of the flow coupler, cutting the magnetic flux of the permanent magnets and inducing an electromagnetic force field in the adjacent duct. This force field develops a pressure head in a separate primary liquid metal circuit, circulating coolant in the opposite direction from the first duct. The use of permanent magnets, preferably of Alnico and most preferably Alnio No. 6, decreases the bulkiness associated with electromagnets, as well as the complexity associated with cooling systems, thus increasing the ease of installation and utility in nuclear reactor systems. It also eliminates the need for an electrical power source.

DETAILED DESCRIPTION OF THE PREFERRED EMBODIMENTS

The coolant circulation system of the present invention is particularly suitable for use in the liquid metal coolant systems of nuclear reactors because of the improved safety, efficiency and reliability of its component parts over the prior art. However, it must be noted that the present coolant system and its constituent electromagnetic pumps will be useful in many other applications. As the preferred embodiment, and for ease of explanation, the coolant circulation system of the present invention will be described as the liquid metal coolant system of a nuclear reactor, using sodium as the coolant, in the following detailed description. This should not, however, be construed as a limitation of the scope of this invention.

Figure 1:
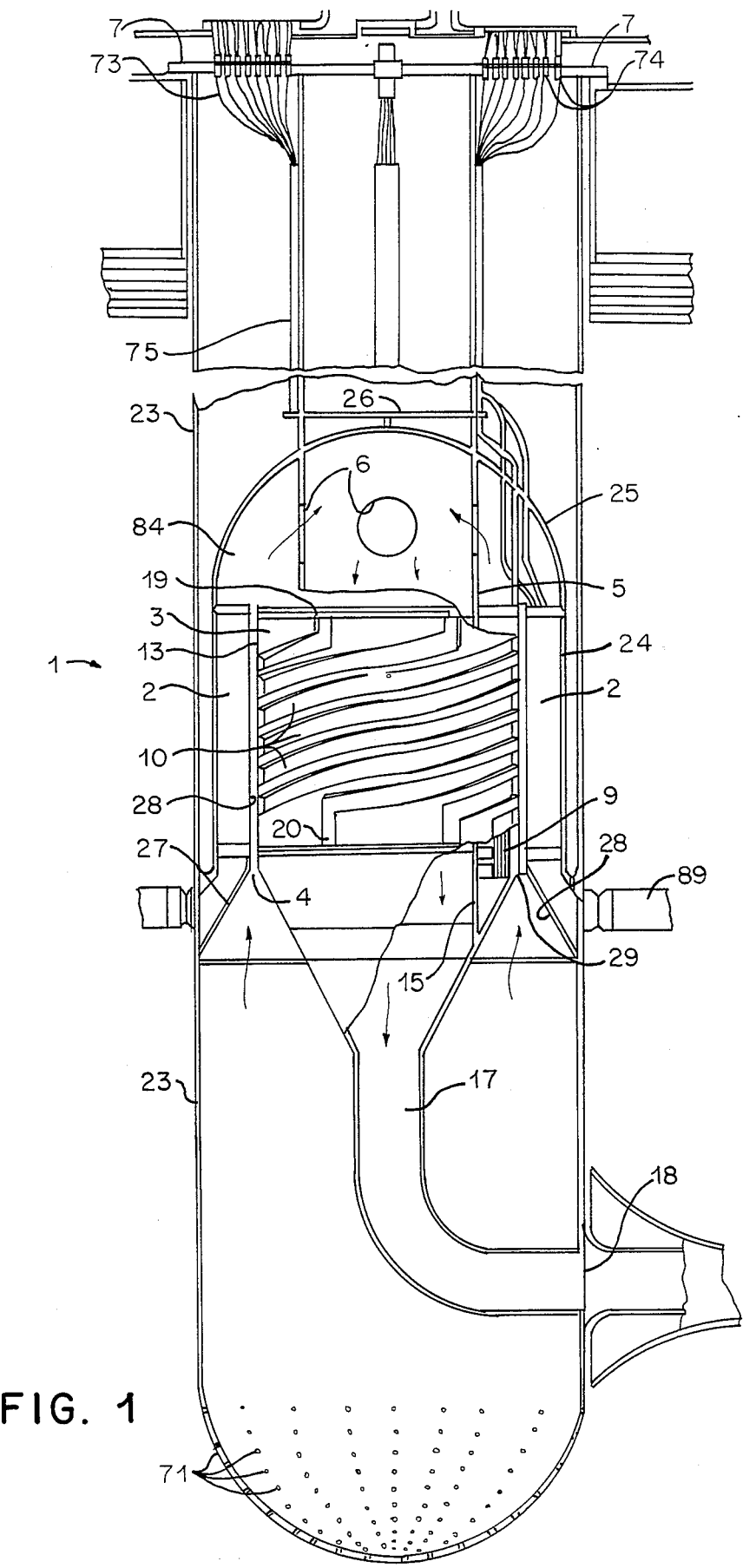
FIG. 1 is a cross-sectional elevational view of the annular linear induction pump of the present invention.

FIG. 1 illustrates an annular linear induction pump (1) of the present invention. The pump is comprised of a central core body (3) supported by an inner flow cylinder (5) welded, in turn, to a mounting flange (7).

The primary coils (9) are helically wound on the central core body (3). The central core body (3) is constructed of transformer steel laminations with glass cloth-synthetic mica sheet electrical insulation. The coils (9) are comprised of a plurality of 60 mil square ceramic insulated copper wires wound in helical slots (10) formed in the outer surface of the central core body (3). Ceramic insulation on the copper wires limits cross current flow resulting from a slight potential gradient between wires. The outer surface of the central core body (3) is encased in a light gage austenitic stainless steel jacket (13) to prevent contact of the transformer steel laminations and the copper coils with the liquid sodium.

The inner surface (15) of the inner flow cylinder (5) is also lined with austenitic stainless steel and functions as part of the liquid metal discharge flow passage (17) as well as a structural support for the central core body (3).

The transformer steel laminations of the central core body (3) are electrically insulated from the outer surface stainless steel jacket (13) and the copper coils (9) with glass cloth-synthetic mica sheet (not shown), and the inner surface (15) is also electrically insulated from the transformer steel laminations with glass cloth-synthetic mica.

The helical slots (10) formed in the outer surface of the central core body (3) are arranged in six equally angular starts (19), and the primary coils (9), nested in the slots (10), wind around the core body (3) and are series connected at corresponding terminals (20) along the base of the central core body (3) which are diametrically opposed to the starts (19), thus forming a three-phase, star connected, six pole magnet.

The primary coil windings and the central core body (3) are in sufficiently good thermal contact with the liquid metal coolant (e.g., sodium) to allow the coils (9) to carry a high current supply without overheating. This high current supply requires a low supply voltage, allowing a minimum of electrical insulation thickness, thus permitting a high thermal heat rejection rate.

The central core body (3) is enclosed in a cylindrical pump housing (23) which is also welded to the mounting flange (7). The cylindrical pump housing (23) encloses and supports a pressure dome structure (25) and its vertical support cylinder (24), the pump housing transformer steel laminates (2) and an outer flow cylinder (27), shown in the configuration of an inverted funnel. The inner surface (28) of the pump housing transformer steel laminates (2) and the outer steel jacket (13) of the central core body (3) define an annular flow passage (4) through which upwardly directed liquid sodium coolant passes.

A plurality of holes (71) are located at the lower end of the cylindrical pump housing (23) and are arranged and sized to permit induction of liquid sodium through the cylindrical pump housing wall. Sodium thus inducted within the cylindrical pump housing (23) is directed upwardly by pump suction toward the annular flow passage (4). As sodium flows upward through the annular flow passage (4), it experiences an increase in pressure as it passes each electromagnetic coil (9). Sodium enters a high pressure discharge plenum (84) under the pressure dome structure (25) and exits through openings (6) in the inner flow cylinder (5), passing downward to a discharge flow passage (17) and pump discharge nozzle (18).

The configuration of the coil windings creates a helical magnetic field. This causes the liquid sodium to tend to follow a helical path as it flows upward through the annular flow passage (4). Six longitudinal baffles (29), equally spaced around the annular flow passage (4), inhibit rotation of the liquid sodium. The baffles may include a plurality, preferably six, electrodes, best seen in FIGS. 3 and 4.

Wiring leads (73) to the longitudinal electrode baffles (29) and to said primary coils (9) are encased in pressure tight conduits (75) which are sealed to the pressure dome structure (25) at their point of penetration. The electrode wiring leads (73) pass from conduits (75) above the liquid metal level and are attached to electrical feed-throughs (74) located in the pump mounting flange (7). Similarly, the conducting wires of the primary coil wiring leads pass from the conduits above the liquid coolant level and are attached to electrical feed-throughs also located in the pump mounting flange.

A vent hole (26) located at the highest intersection point between the inner flow cylinder (5) and the pressure dome structure (25) allows any liquid metal cover gas that may have been swept into the pressure dome to pass through a continuous vent.

Figure 2:
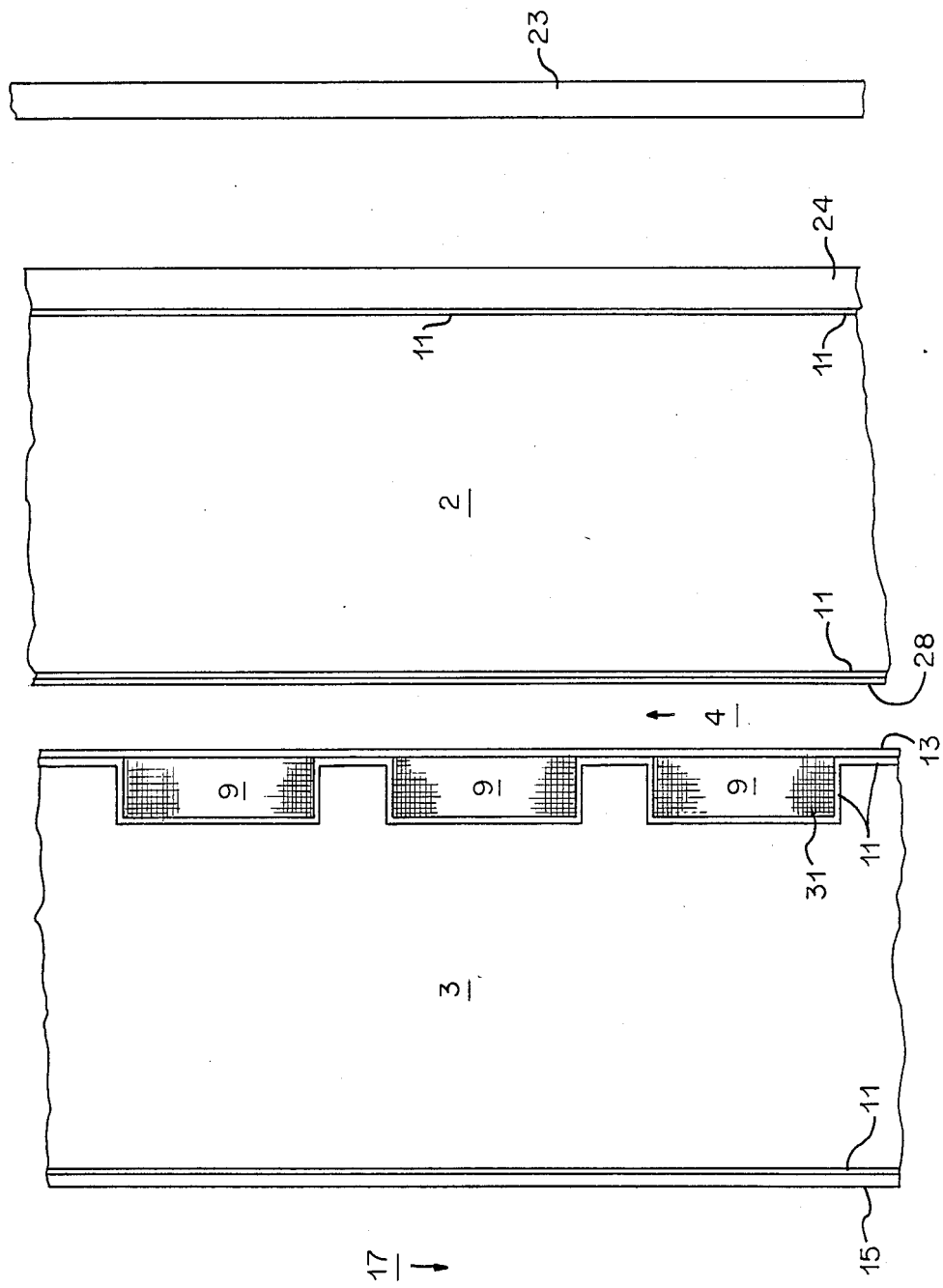
FIG. 2 is a sectional detail of FIG. 1 showing a portion of the central core body and three helical coils, and the pump housing.

Referring to FIG. 2, copper conducting wires (31) of the primary coils (9) are situated in helical slots (10), which are formed in the transformer steel laminations of the central core body (3). The light gauge austenitic stainless steel jacket (13) is electrically insulated from the transformer steel laminations with glass cloth-synthetic mica sheet. The sodium discharge flow passage (17) and the copper coils (9) are also electrically insulated with glass cloth-synthetic mica. The pump housing transformer steel lamination (2) are electrically insulated from the light gauge austenitic stainless steel jacket of the inner surface (28) with glass cloth-synthetic mica sheet (11). The vertical support cylinder (24) for the pressure dome structure is electrically insulated from the pump housing transformer steel lamination (2) with glass cloth-synthetic mica sheet (11). The cylindrical pump housing (23) need not be insulated.

Figure 3:
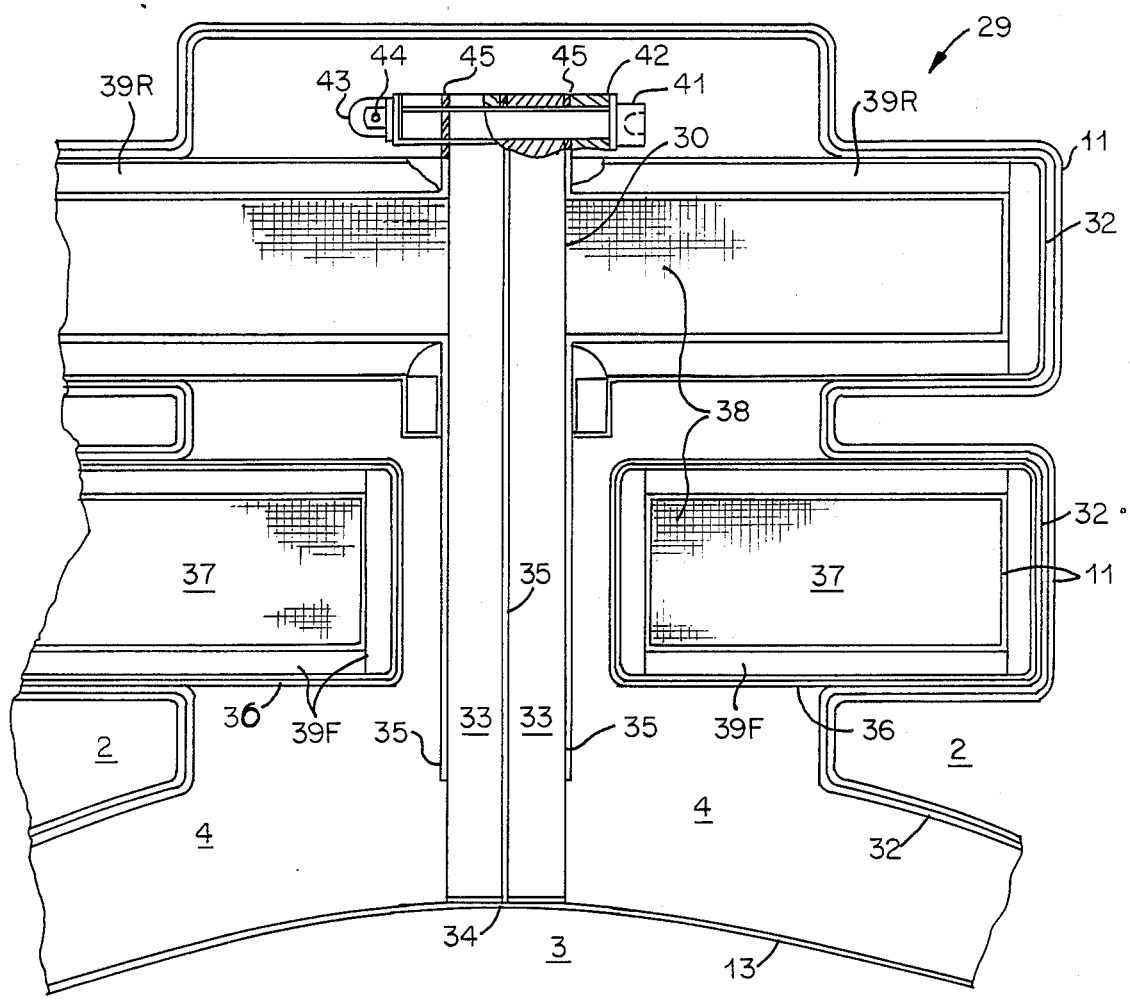
FIG. 3 is a sectional detail of FIG. 1 showing the electrodes and electrode leads within their pressure tight conduit.
Figure 4A:
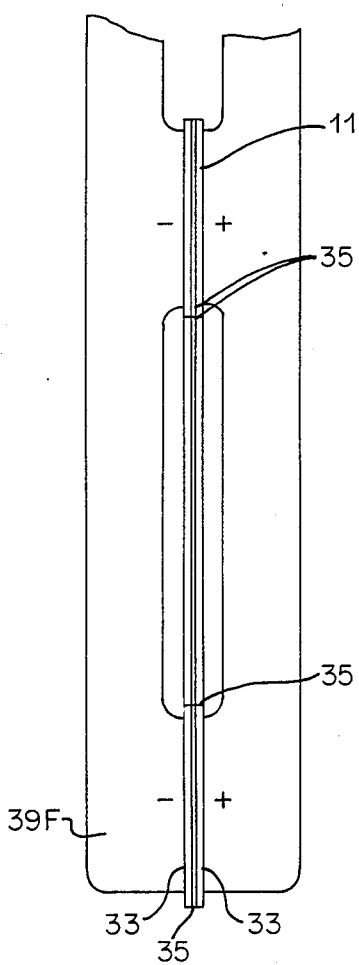
FIG. 4 illustrates the construction of the electrodes of FIG. 3.
Figure 4B:
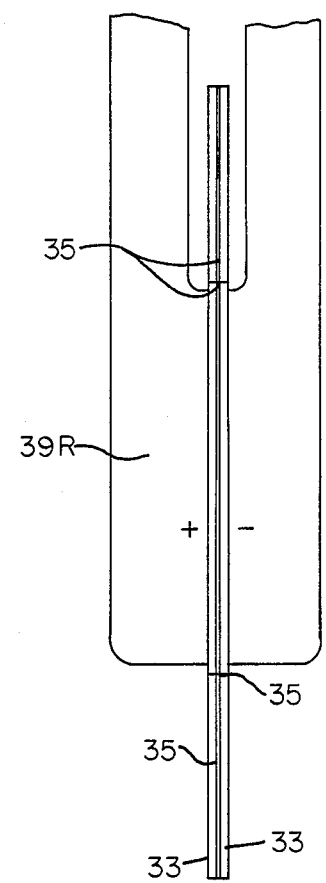

Referring to FIG. 3, the interior of one of the vertical baffles (29 in FIG. 1) is seen, showing the construction of the electrodes and the copper wiring. FIG. 3 shows a horizontal cross-section, taken through the middle of the baffle. The electrodes (33) are bolted together around intersititial alumina insulation (35). The portion of each electrode (33) extending into the annular flow passage (4) is not insulated electrically from the liquid metal with alumina (35), except at the electrode edges (34) abutting the central core body (3). The electrode leads (37) are preferably 60 mil square copper conducting wire (38) encased in an austenitic stainless steel pressure tight conduit (39). The conduits are designated 39F (front) and 39R (rear) to show their relative orientation with respect to the core body (3) and to distinguish between the two views of an electrode seen in FIG. 4. The copper wires (38) are electrically insulated from the conduit (39) with glass cloth-synthetic mica sheet (11) and the outer surface of the conduit (39) is electrically insulated with alumina (36). The conducting wires (38) are electrically connected to the electrodes (33) by brazing at specific points (30) of the three-section electrode. The arrangement of connections is best seen in FIG. 4. Each conduit (39) is bolted to its electrode (33) with a plurality of austenitic stainless steel socket head cap screws (41). Flat washers (42), an acorn nut (43) and roll pin (44), all of austenitic stainless steel complete the bolting assembly. The bolt holes in both the conduit bolting flanges and the electrodes are electrically insulated with alumina. The conduit bolting flanges are pressure sealed at the contact point with the electrodes (33) through gaskets (45). The pump housing transformer steel laminates (2) are insulated from the liquid sodium flowing through the annular flow passage (4) by a light gauge austenitic steel jacket (32) and glass cloth-synthetic mica sheet electrical insulation (11).

Referring to FIG. 4, the three-section electrodes are shown in elevation, the electrodes, being viewed edge-on as they appear vertically in the baffles, as seen from the perspective of the central core body. Each electrode assembly is comprised of two electrodes (33), each of which is made up of three metal sections arranged vertically, separated from each other by alumina insulation (35). Front conduits (39F) are bolted together and make electrical connection with the conducting wires (inside the conduits shown here) at the upper and lower electrode segments. Rear conduits (39R) are bolted together and make electrical connections (i.e., 30 in FIG. 3) through the middle electrode sections. Six conduit and electrode assemblies constitute the direct current electrodes. It will be understood that the conduits 39F and 39R seen in FIG. 4 are actually arranged in tandem, with conduit 39F in front of 39R and the same electrodes 33 running through both conduits as it extends away from the cental core body. The two conduits 39F and 39R are arranged left and right, respectively, in FIG. 4 to simplify discussion.

Figure 5:
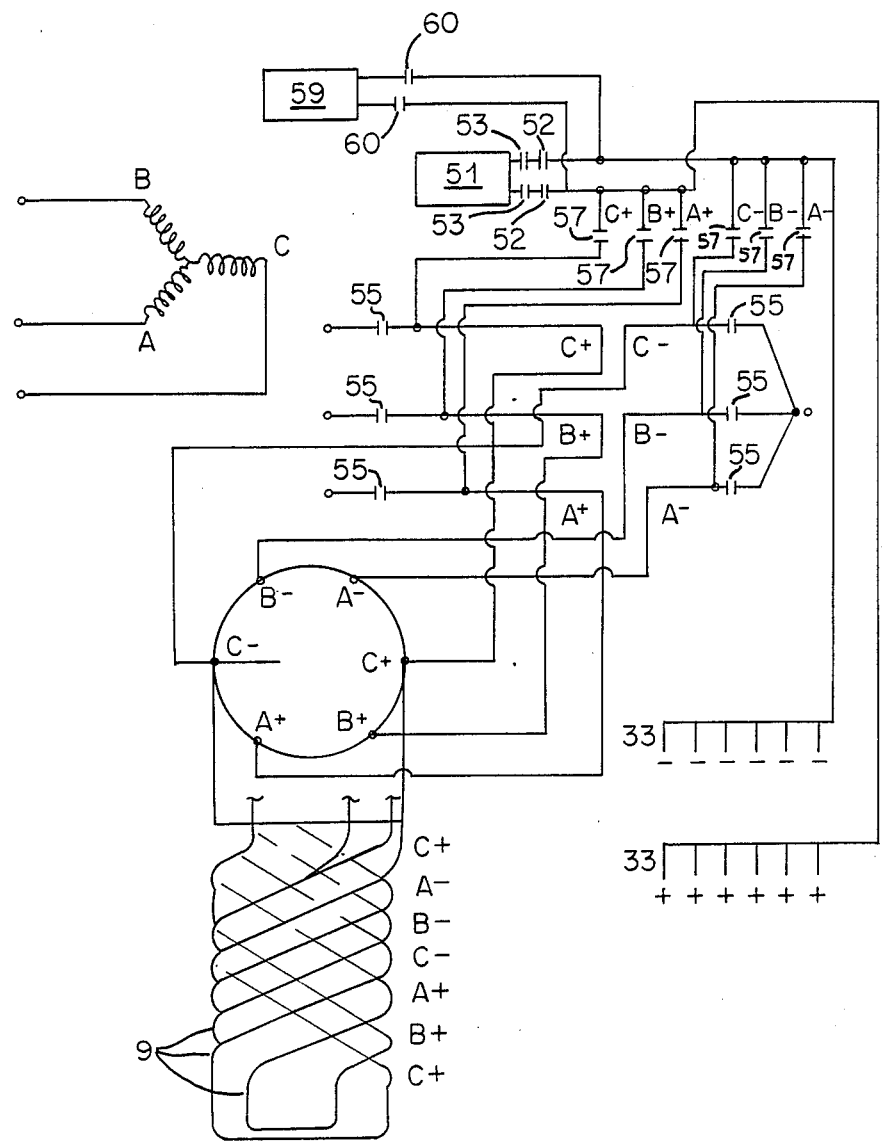
FIG. 5 is a electric wiring diagram of the annular linear induction pump wiring system.

Referring to FIG. 5, the primary coils (9) are electrically connected in a star configuration, with the six individual coils identified as A+, B+, C+, A−, B−, C−. A homopolar generator (51) is connected to the coils (9) through a homopolar switch (53). The coils (9) are connected to their alternating current supply through an A/C switch (55) and connected to their direct current supply through a D/C switch (57). The A/C switch (55) and D/C switch (57) are interlocked such that when one is closed the other is open. During alternating current operation, the A/C switch (55) is closed and the homopolar switch (53) and D/C switch (57) are open. On loss of alternating current the A/C switch (55) opens and the homopolar switch (53) and D/C switch (57) close automatically, channeling the direct current output of the homopolar generator (51) to the primary coils and to the electrodes (33).

A plurality of batteries (59) are series/parallel connected and tied into a direct current circuit through switches (60 and 52) on a common armature such that when one switch is closed, the other is open. During alternating current operation as well as when the homopolar generator (51) is delivering energy into the direct current circuit, the homopolar generator switch (52) is closed and the battery switch (60) is open. When the homopolar generator output has decayed to approximately 10 percent of the full capacity requirement of the pump, the battery switch (60) is closed and the homopolar generator switch (52) opened, sending direct current from the batteries (59) to the primary coils (9) and electrodes (33) and isolating the homopolar generator from the batteries.

Figure 6:
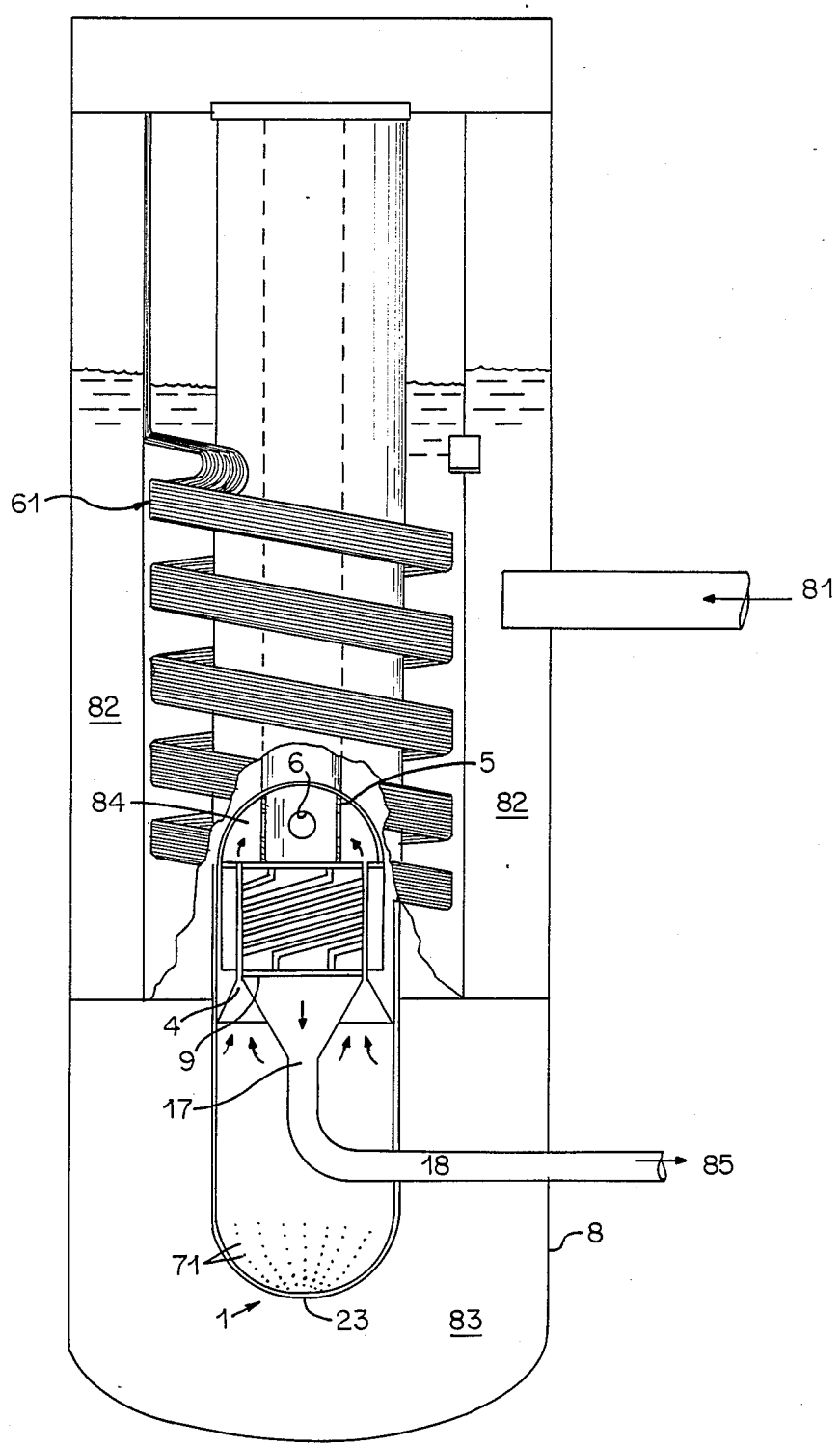
FIG. 6 is a longitudinal, cross-sectional elevation of a satellite heat exchanger vessel containing a centrally situated circulation system in accordance with the invention.

FIG. 6 illustrates the installation of the annular linear induction pump (1) as a central module within a satellite vessel (8) that contains a helical coil heat exchanger (61) which may also serve as a steam generator. Alternate steam generator configurations which could benefit from the present invention are disclosed in commonly assigned, copending U.S. applications Ser. No. 732,369 filed May 9, 1985 (U.S. Pat. No. 4,644,906) and Ser. No. 813,598 filed Dec. 26, 1985.

The annular linear induction pump of the present invention is capable of continuous operation on alternating current, without cooling, in liquid sodium at temperatures around 380° C. (716° F.) and for short periods of time at temperatures up to about 450° C. (842° F.). On direct current, at reduced flow, and without cooling, liquid sodium at temperatures up to about 540° C. (1000° F.) can be accomodated. If the power to the pumps is cut off, the pump can withstand temperatures higher than 540° C. (1000° F.).

A plurality of holes (71) are located at the lower end of the cylindrical pump housing (23) through which liquid sodium enters. As sodium flows upwardly through the annular passage (4), it experiences an increase in pressure as it passes each electromagnetic coil (9). The coolant exits through openings (6) in the inner flow cylinder (5), passing downwardly through the discharge flow passage (17) to the pump discharge nozzle (18).

Flow exiting the nuclear core (not shown) enters the satellite vessel (8) through a satellite vessel inlet duct (81) and fills the upper plenum (82). Flowing downwardly over heat exchanger coils (61), the primary flow exits into the cold lower plenum (83). Suction from the annular linear induction pump (1) draws sodium from the lower plenum (83) through the pump inlet holes (71). The sodium then enters the annular flow passage of the pump (4) where electromagnetic forces generated by the primary coils (9) act on the sodium to accelerate it and increase its pressure. The sodium leaving the annular flow passage (4) enters the high pressure discharge plenum (84) and sodium flows through ducts (6) in the inner flow cylinder (5). The inner flow cylinder (5) gradually reduces in diameter to mate with a discharge flow passage (17). Discharged coolant exits the side of the cylindrical pump housing (23) through the discharge nozzle (18), returning to the nuclear core through satellite vessel outlet duct (85) and thus completing the primary circuit.

Figure 7:
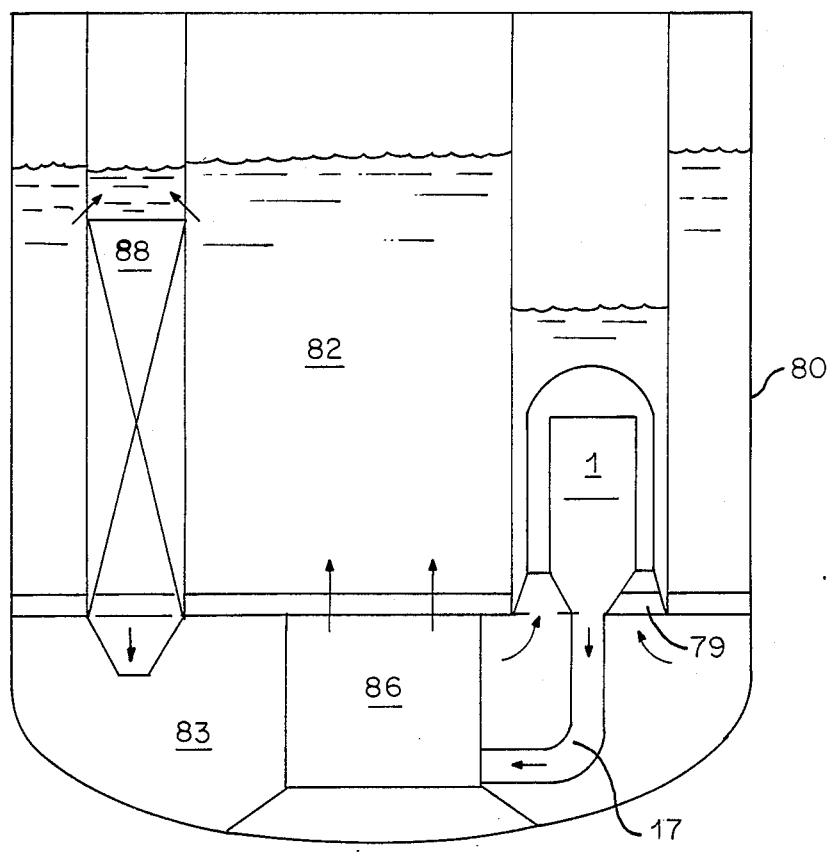
FIG. 7 is a simplified, cross-sectional, elevational view of a pool reactor utilizing a circulation system in accordance with the invention.

Referring to FIG. 7, an alternate environment for the annular linear induction pump of the present invention is shown. In a pool-type reactor the pump (1), heat exhangers (88) and reactor core (86) are all located within a reactor vessle (80) which is partially filled with liquid metal coolant, e.g., sodium. Suction from the pump (1) draws liquid sodium from the lower plenum (83) through the pump inlet area (79). Electromagnetic forces of the pump accelerate and pressurize the liquid sodium, which is discharged into the core area (86) through a pump discharge duct (17). Sodium exits the core area (86) into the hot upper plenum (82) and descends by gravity through heat exchanger(s) (88), returning to the cold lower plenum (83), to be recirculated by the pump (1).

Figure 8:
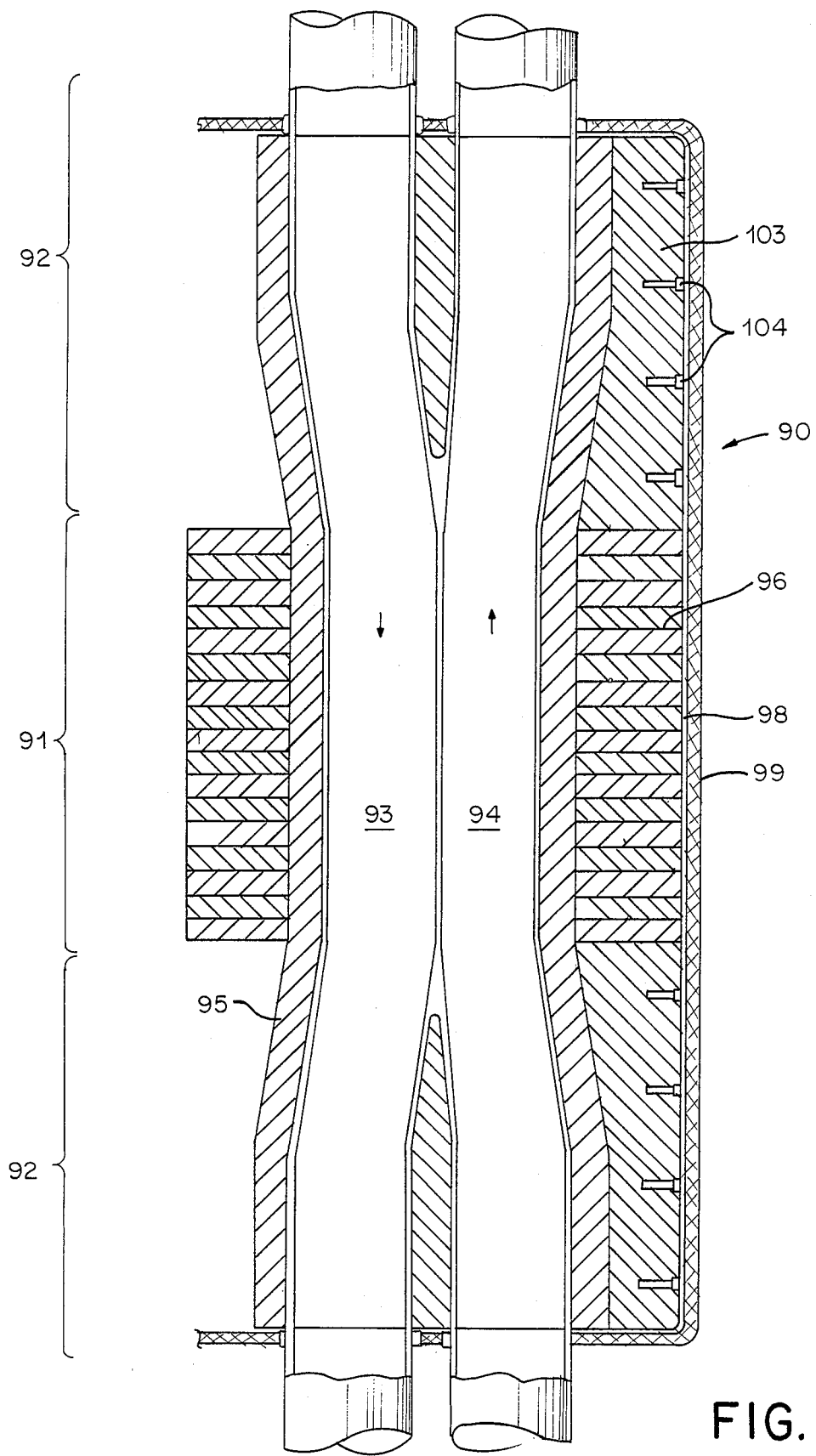
FIG. 8 is a longitudinal, cross-sectional, elevational view of a fluid flow coupler module of this invention.

Referring to FIG. 8, the circulation system of the present invention optionally includes a plurality of flow couplers (90), each of which comprises an active, flow coupler region (91) and identical end or transition regions (92).

Figure 9:
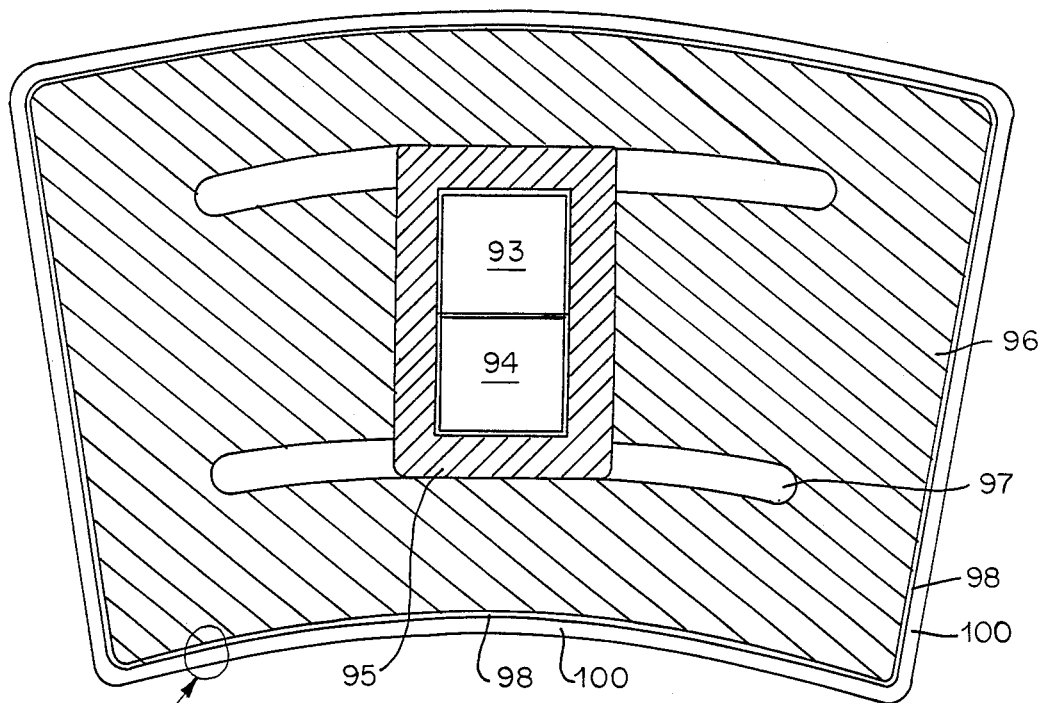
FIG. 9 is a sectional plan view of the fluid flow coupler taken across line IX—IX in FIG. 8.
Figure 10:
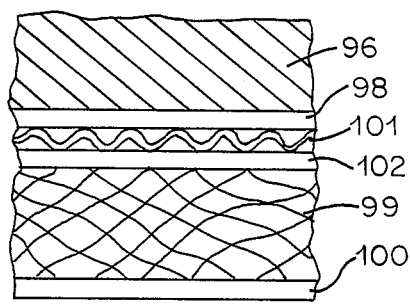
FIG. 10 is an enlarged detail of the cladding, cooling annulus, and insulation of the flow coupler of FIG. 8.

Referring to FIGS. 8, 9 and 10, the fluid flow coupler (90) of the present invention comprises a pump section (93) and a generator section (94), both of which are square stainless steel-lined ducts. These ducts are encased in a copper busbar housing (95) which in turn is placed within stacks of annularly shaped permanent magnet plates (96). Gaps (97, FIG. 9) extend horizontally from the four corners of the copper busbar (95), and extend vertically along the length of the flow coupler. The permanent magnet plates (96) are encased in a stainless steel shroud (98).

As seen in FIG. 10, which is a detail of the outer encasing structure of the flow coupler, a coolant pathway (101) surrounds the stainless steel shroud (98), and is itself encased in a second stainless steel shroud (102). Insulation (99) such as potassium titanate fibers, surrounds the second stainless steel shroud (98). The entire device is encased by an outer assembly shroud (100), also of stainless steel.

At both ends of the flow coupler the pump (93) and generator (94) ducts separate to form circular ducts in the transition regions (92). The copper busbar (95) extends through this section as two U-shaped segments. Two U-shaped stainless steel segments (103) encase the copper busbar (95). These segments (103) are bolted together (104) and surrounded by the stainless steel shroud (98), coolant pathway (101), and steel encased insulation (99).

Figure 11:
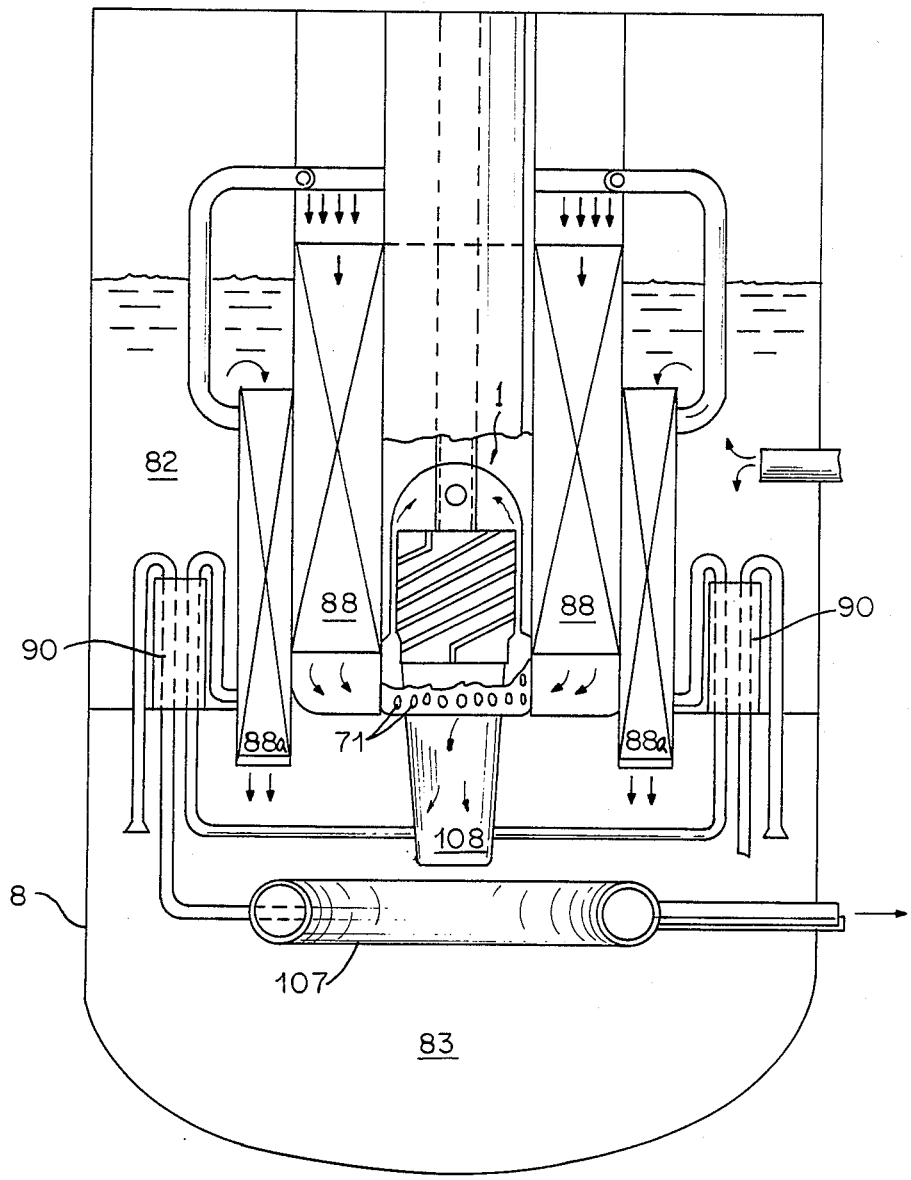
FIG. 11 is a cross-sectional, elevational diagram of a satellite heat exchanger vessel containing a circulation system featuring both a central linear induction pump and a series of flow couplers in accordance with the present invention.

FIG. 11 illustrates an application of both the annular linear induction pump (1) and the fluid flow coupler (90) in an advanced nuclear reactor system design. The annular linear induction pump (1) and fluid flow couplers (90) are integrated into a satellite vessel (8) with heat exchangers (88 and 88a). The annular linear induction pump (1) is installed in the center of the satellite vessel (8), within a secondary heat exchanger (88), e.g., a helical coil steam generator such as that disclosed in commonly assigned, copending U.S. application Ser. No. 582,096, filed Mar. 21, 1984, which is incorporated herein by reference. A primary heat exchanger (88a), or series of heat exchangers, is located radially outwardly from the secondary heat exchanger (88). An annular series of fluid flow couplers (90) is located radially outwardly from the primary heat exchangers (88a). The fluid flow couplers (90) enable primary and intermediate coolant flows to be circulated separately within the satellite vessel without intermingling.

Primary sodium flow from the nuclear core (not shown) enters the satellite vessel (8), filling the upper plenum (82). Flowing downward through the primary heat exchanger (88a), the primary flow is cooled by a secondary sodium countercurrent, and exits into the cold lower plenum (83). Suction from the fluid flow coupler (90) draws sodium from the lower plenum (83) and returns it through discharge manifold (107) to the reactor vessel, completing the primary circuit.

The discharge of the annular linear induction pump (1) induces the primary sodium flow when coolant is pumped from a manifold (108) to the bottom of each flow coupler (90). The sodium exits from the top of the flow coupler (90), and then flows into the bottom of the heat exchanger (88a) producing the secondary countercurrent flow. As the secondary flow passes upwardly through the heat exchanger (88a) where it is heated by the descending primary sodium flow and is piped to the top of the secondary heat exchanger or steam generator (88), over which it descends. Flow exiting the secondary heat exchanger generator (88) enters the suction of the pump (1) through holes (71) at the sides of a pump inlet shroud. The shroud and its associated openings (71) promotes mixing of the flow that leaves the secondary heat exchanger or steam generator (1), thereby minimizing the effects of thermal transients on either the pump or the reactor core. In addition, the mixing serves to assure that all of the flow is well mixed during normal operation when a portion of the steam generator or heat exchanger may have a hotter discharge than another.

After entering the pump suction area of the pump (1) the sodium enters the annular flow passage where the electromagnetic forces of the pump act on the sodium to accelerate it and increase its pressure. The sodium enters the high pressure discharge plenum (84 in FIG. 1) of the pump and exits through a central duct leading to a manifold (108), completing the secondary coolant circuit. A vent pipe to the gaseous space of the satellite vessel may be connected to the flow coupler suction line.

Most preferably, the overall diameter of the pump is approximately 6.5 feet for an 73,000 gpm pump with a 200 psi discharge pressure. The height of the pump from the bottom of the inlet annulus to the top of the outlet plenum is approximately 13 feet and the electromagnetic portion of the annulus area is approximately 9.75 feet high.

The small size of the annular linear induction pump permits it to be located at the elevation of the horizontal diaphragm (89 in FIG. 1), an elevation which would be below the core of the nuclear reactor. Such an installation strongly promotes natural circulation of the sodium upon loss of all pump power, thereby enhancing safety in that sodium cooled in the heat exchanger region will flow directly through the pump prior to returning to the reactor, utilizing the natural buoyancy head to promote flow through the reactor core. In addition, the pump design also promotes natural circulation due to its low hydraulic resistance. Thus, for such a pump the use of a flow eductor followed by a diffuser may be used with a pipe that leads directly to the reactor core inlet. Alternatively, the coupling of this pipe with the pump discharge can be accomplished with a pipe coupling which allows horizontal movements for thermal growth; an expansion bellows; a pipe with elbows in the line (for accomodating thermal growth); or with a direct connection with the pump support. For a direct connection with the pump support the top of the pump support cylinder is connected to the vessel head support structure in a manner that allows lateral movement of the bottom pipe.

The major advantage of the present coolant circulation system over any currently in use, particularly in a nuclear power plant setting, is the ability to utilize the obvious advantages inherent to electromagnetic pumps while avoiding the disadvantages associated with the pumps of the prior art. Electromagnetic pumps, such as the annular linear induction pump and fluid flow coupler of the present system, have no moving parts and are, therefore, more reliable than conventional mechanical pumps. Prior art pumps using electromagnets require external cooling systems to cool the windings, causing inefficiencies, complicating the installation and maintenance of other reactor components, and increasing the size of the pump.

The present coolant circulation system, although powered by electromagnetic pumps, has eliminated the need for costly alternative power sources. For example, in the case of a power failure, a coolant system powered by prior art electromagnetic pumps would immediately stop functioning. However, the present alternating current system is constructed to also operate on direct current. Upon loss of alternating current, the annular linear induction pump automatically switches to an attached, direct current homopolar generator, which provides sufficient current to ensure a gradual reduction in flow rate. Once the flow rate approaches approximately 10% of capacity, the homopolar generator is automatically replaced by a series of connected batteries. This reduced rate of flow is sufficient for removing decay heat from the nuclear fuel of the reactor and can be maintained for extended periods.

The fluid flow coupler also aids in maintaining flow. Flow through either of the parallel ducts of the flow coupler produces a magnetic field which promotes an opposite flow through the adjoining duct. As long as the annular linear induction pump produces flow through one of the parallel ducts, an equal and opposite flow will result in the second duct.

The aforementioned patents and reports are incorporated herein by reference. From the foregoing disclosure, variations and modifications will be readily apparent to persons skilled in this art. However, all such obvious variations are intended to be within the scope of the invention as defined by the appended claims.

We claim:

1. A liquid metal circulation system comprising an electromagnetic pump comprised of:
    (a) an elongated cylindrical pump support housing;
    (b) a cylindrical pressure dome structure coaxially situated and supported within said pump support housing, having a closed, hemispherical upper end and an open, cylindrical lower end;
    (c) a cylindrical pump coaxially situated within said pressure dome structure including
        (1) a central core body of laminated transformer steel having six peripherally equally spaced helical grooves on its outer surface extending the entire length of said central core body,
        (2) a multiplicity of square, ceramic insulated copper wires situated in said helical grooves,
        (3) electrical leads extending from the terminal ends of said square copper wires through the upper end of said pressure dome structure and to a three-phase low voltage/high amperage power source,
        (4) an austenitic stainless steel jacket covering the outer surface of said central core body and covering said helically coiled square copper wires, said outer stainless steel jacket and the inner surface of said pressure dome structure defining an annular flow passage, said stainless steel jacket being electrically insulated from said square copper wires and said central core body by glass cloth-synthetic mica insulation while maintaining sufficient thermal contact to permit heat transfer from the copper wires and central core body to the annular flow passage,
        (5) a plurality of vertical baffles extending into said annular flow passage and equally spaced radially about said central core body, which baffles are effective to inhibit rotational flow or liquid metal about said central body in said annular flow passage,
        (6) a central flow cylinder extending longitudinally through the center of said central core body; and
    (d) a discharge pipe connected to the lower end of the central flow cylinder and extending to the outside of said cylindrical pump support housing.

2. The liquid metal circulation system of claim 1, wherein electrodes are enclosed in said vertical baffles for the length of said central core body, which electrodes are connected to said three-phase low voltage/high amperage power source.

3. The liquid metal circulation system of claim 1, wherein the elongated cylindrical pump support housing has a closed, rounded lower end which has a multiplicity of perforations suitable to mixingly admit liquid metal inside said pump support housing.

4. The liquid metal circulation system of claim 1, wherein the end of the discharge pipe leading outside the cylindrical pump housing is connected to at least one flow coupler.

5. The liquid metal circulation system of claim 1, wherein the discharge pipe directs flow into a flow manifold which, in turn, is connected to a plurality of flow couplers.

6. The liquid metal circulation system of claim 4, wherein said flow coupler comprises
    (a) two parallel stainless steel-lined ducts having a central section wherein said ducts are substantially square or rectangular in cross-section and situated in close parallel relation such that the square or rectangular ducts share a common stainless steel wall;
    (b) a copper busbar housing which encases said ducts for at least the entire longitudinal length of the central section; and
    (c) a plurality of permanent magnet plates stacked so as to encase said copper busbar housing along the entire longitudinal length of the central section.

7. The liquid metal circulation system of claim 6, wherein said permanent magnet plates are composed of Alnico No. 6.

8. The liquid metal circulation system of claim 2, wherein said power source includes
    (a) alternating current power means;
    (b) a homopolar generator having an energy-storing flywheel; and
    (c) series/parallel-connected batteries providing a direct current source; said power source components (a), (b) and (c) being interconnected with automatic switching means such that said alternating current power means is the primary electrical power source for the electromagnetic pump, and upon failure of said alternating current power means, the power source is automatically switched to said homopolar generator, and upon reduction of liquid metal circulation to a flow rate sustainable by the direct current provided by said batteries, the power source is automatically switched to said batteries.

9. The liquid metal circulation system of claim 1, wherein said power source includes the components:
    (a) alternating current power means, and
    (b) a homopolar generator having an energy-storing flywheel, said power source components being interconnected with automatic switching means so that said alternating current power means (a) is the primary electrical power source for the electromagnetic pump, and upon failure of said alternating current power means, the power source is automatically switched to said homopolar generator (b).

10. The liquid metal circulation system of claim 9, wherein there are six vertical baffles which enclose six electrodes.

11. A liquid metal circulation system according to claim 1, wherein said square copper wires are 60 mil square copper wires.

12. A liquid metal heat exchanger module comprising a cylindrical satellite vessel closed at both ends being separated into upper and lower plenums, said upper plenum having at least one intake duct and said lower plenum having at least one outlet duct, said liquid metal heat exchanger module further comprising:
    a liquid metal circulation system comprising
    (a) an elongated cylindrical pump support housing having a closed lower end and having a series of perforations providing communication between said lower plenum and the inside of the pump support housing;
    (b) a cylindrical pressure dome structure coaxially situated and supported within said pump support housing, having a closed, hemispherical upper end and an open, cylindrical lower end;

(c) a cylindrical pump coaxially situated within said pressure dome structure including
   (1) a central core body of laminated transformer steel having six peripherally equally spaced helical grooves on its outer surface extending the entire length of said central core body,
   (2) a multiplicity of square, ceramic insulated copper wires situated in said helical grooves,
   (3) electrical leads extending from the upper terminal ends of said square copper wires through the upper end of said pressure dome structure and to a three-phase low voltage/high amperage power source,
   (4) a austenitic stainless steel jacket covering the outer surface of said central core body and covering said helically coiled copper wires, said outer stainless steel jacket and the inner surface of said pressure dome structure defining an annular flow passage, said stainless steel jacket being electrically insulated from said square copper wires and said central core body by glass cloth-synthetic mica insulation while maintaining sufficient thermal contact to permit heat transfer from the copper wires and central core body to the annular flow passage, the lower end of said annular flow passasge being higher than said perforations in the cylindrical pump support housing,
   (5) a plurality of vertical baffles extending into said annular flow passage and equally spaced radially about said central core body, which baffles are effective to inhibit rotational flow of liquid metal about said central core body in said annular flow passage,
   (6) a central flow cylinder extending longitudinally through the center of said central bore body; and (d) a discharge pipe connected to the lower end of the central flow cylinder and extending to the outside of said cylindrical pump housing;

(e) heat exchanger means capable of receiving liquid metal from the upper plenum and and introducing it into the lower plenum at a lower temperature.

13. The liquid metal heat exchanger module of claim 12, wherein electrodes are enclosed in said vertical baffles for the length of said central core body, which electrodes are connected to said three-phase low voltage/high amperage power source.

14. The liquid metal heat exchanger module of claim 12, wherein the end of said discharge pipe leading outside the cylindrical pump housing is connected to at least one flow coupler.

15. The liquid metal heat exchanger module of claim 12, wherein the discharge pipe directs flow into a flow manifold which, in turn, is connected to a plurality of flow couplers.

16. The liquid metal heat exchanger module of claim 14, wherein said flow coupler comprises
   (a) two parallel stainless steel-lined ducts having a central section wherein said ducts are substantially square or rectangular in cross-section and situated in close parallel relation such that the square or rectangular ducts share a common stainless steel wall;
   (b) a copper busbar housing which encases said ducts for at least the entire longitudinal length of the central section; and
   (c) a plurality of permanent magnet plates stacked so as to encase said copper busbar housing along the entire longitudinal length of the central section.

17. The liquid metal heat exchanger module of 16, wherein said permanent magnet plates are composed of Alnico No. 6.

18. The liquid metal heat exchanger module of claim 12, wherein said power source includes
   (a) alternating current power means;
   (b) a homopolar generator having an energy-storing flywheel; and
   (c) series/parallel-connected batteries providing a direct current source;
said power source components (a), (b) and (c) being interconnected with automatic switching means such that said alternating current power means is the primary electrical power source for the electromagnetic pump, and upon failure of said alternating current power means, the power source is automatically switched to said homopolar generator, and upon reduction of liquid metal circulation to a flow rate sustainable by the direct current provided by said batteries, the power source is automatically switched to said batteries.

19. The liquid metal heat exchanger module of claim 18, wherein there are six vertical baffles which enclose six electrodes.

20. A liquid metal heat exchanger module according to claim 12, wherein said square copper wires are 60 mil square copper wires.

21. A pool reactor comprising a vessel, a nuclear core which is cooled by a liquid metal, at least one heat exchanger capable of receiving heated liquid metal from said nuclear core and discharging liquid metal at a lower temperature, and a liquid metal circulation system comprising an electromagnetic pump including (a) an elongated cylindrical pump support housing;

(b) a cylindrical pressure dome structure coaxially situated and supported within said pump support housing, having a closed, hemispherical upper end and an open, cylindrical lower end;

(c) a cylindrical pump coaxially situated within said pressure dome structure including
   (1) a central core body of laminated transformer steel having six peripherally equally spaced helical grooves on its outer surface extending the entire length of said central core body,
   (2) a multiplicity of ceramic square, insulated copper wires situated in said helical grooves,
   (3) electrical leads extending from the terminal ends of said square copper wires through the upper end of said pressure dome structure and to a three-phase low voltage/high amperage power source,
   (4) an austenitic stainless steel jacket covering the outer surface of said central core body and covering said helically coiled copper wires, said outer stainless steel jacket and the inner surface of said pressure dome structure defining an annular flow passage, said stainless steel jacket being electrically insulated from said square copper wires and said central core body by glass cloth-synthetic mica insulation while maitnaining sufficient thermal contact to permit heat transfer from the copper wires and central core body to the annular flow passage,
   (5) a plurality of vertical baffles extending into said annular flow passage and equally spaced radially about said central core body, which baffles are effective to inhibit rotational flow of liquid metal about said central core body in said annular flow passage, (6) a central flow cylinder extending longitudinally through the center of said central core body; and (d) a discharge pipe connected to the lower end of the central flow cylinder and extending to the nuclear core.

22. A pool reactor according to claim 21, wherein said square copper wires are 60 mil square copper wires.

* * * * *